(12) United States Patent
Hsieh (10) Patent No.: US 10,913,671 B2
(45) Date of Patent: Feb. 9, 2021

(54) MICROBIOLOGICAL CULTURE APPARATUS OF WASTEWATER TREATMENT SYSTEM

(71) Applicant: KUAN YUAN PAPER MFG. CO., LTD., Miaoli (TW)

(72) Inventor: Kuang Yuan Hsieh, Miaoli (TW)

(73) Assignee: Kuan Yuan Paper Mfg. Co., Ltd., Zhunan Township (TW)

( * ) Notice: Subject to any disclaimer, the term of this patent is extended or adjusted under 35 U.S.C. 154(b) by 0 days.

(21) Appl. No.: 16/831,740

(22) Filed: Mar. 26, 2020

(65) Prior Publication Data

US 2020/0308034 A1  Oct. 1, 2020

(30) Foreign Application Priority Data

Mar. 29, 2019 (TW) .............................. 108111122 A
Mar. 13, 2020 (TW) .............................. 109202889 U (51) Int. Cl.
*C02F 3/10* (2006.01)
*C02F 3/04* (2006.01)

(52) U.S. Cl.
CPC .............. *C02F 3/101* (2013.01); *C02F 3/043* (2013.01)

(58) Field of Classification Search
CPC ............... C02F 3/04; C02F 3/101; C02F 3/10

USPC ................................................. 210/150, 615
See application file for complete search history.

(56) References Cited

U.S. PATENT DOCUMENTS 3,835,039 A * 9/1974 Ciambrone ............... C02F 3/06
                                                                210/615
3,876,542 A * 4/1975 Carlson ................... C02F 3/101
                                                                210/150

FOREIGN PATENT DOCUMENTS

CN          101045575 A      10/2007

OTHER PUBLICATIONS

Office Action of corresponding TW application 108111122, published on Nov. 12, 2019.
Notice of Allowance of corresponding TW application 108111122, published on Mar. 20, 2020.

* cited by examiner

*Primary Examiner* — Claire A Norris
(74) *Attorney, Agent, or Firm* — Wang Law Firm, Inc.

(57) ABSTRACT

A microbiological culture apparatus of a wastewater treatment system includes a cage, a spacing device received in the cage, and a plurality of culture woods vertically received in the cage and positioned by the spacing device. The spacing device restricts the culture woods in an upright status and spaces them from each other to form a passageway between each two of the neighboring culture woods. Wastewater flows through the passageways to have low temperature and high dissolved oxygen.

3 Claims, 8 Drawing Sheets

MICROBIOLOGICAL CULTURE APPARATUS OF WASTEWATER TREATMENT SYSTEM

BACKGROUND OF THE INVENTION

1. Technical Field

The present invention relates to a wastewater treatment system, and more particularly to a microbiological culture apparatus of a wastewater treatment system.

2. Description of Related Art

Recycling of papers is getting more and more important in present days since shortage of natural resource is more and more serious. In order to separate fibers in waste paper and remove ink from fibers, it needs specified chemical solutions and water in aforesaid processes. As a result, it generates large amount of wastewater in the process of paper recycling.

Treatments of wastewater in paper recycling including coagulation process, biochemical process, and chemical process. Bacteria, such as anaerobic bacteria and aerobic bacteria, are used in biochemical process. Environment is deeply effects the works of bacteria, such as temperature and pH value of water. Typically, high temperature is bad for bacteria, and water temperature always increases in wastewater treatment. A conventional solution is adding chemical solution to help the works of bacteria instead of lowering the temperature. It only has limited effect.

Trickling filters are one of the common elements in the conventional wastewater treatment system. The conventional trickling filter usually is provided with a spraying device thereabove and wooden boards therein. The spraying device spraying device provides wastewater to the wooden boards, and bacteria are grown on the wooden boards to treat the wastewater.

The conventional wooden boards are stacked in the trickling filter, so that poor ventilation is occurred in the trickling filter that causes temperature is high. It is known that bacteria will have low activity in a hot environment. Therefore, the conventional trickling filter can't have a satisfied result.

Besides, sludge will accumulated on and between the wooden boards. They need to be cleaned in a determined period, and it needs to take all the wooden boards out of the trickling filter for cleaning task. It is not an easy job.

Some trickling filters provide tires to replace the wooden boards. But the tires still have the aforesaid problems.

BRIEF SUMMARY OF THE INVENTION

In view of the above, the primary objective of the present invention is to provide a microbiological culture apparatus of a wastewater treatment system, which may overcome aforesaid problems.

In order to achieve the objective of the present invention, a microbiological culture apparatus of a wastewater treatment system includes a cage having a receiving room therein and a plurality of apertures on a bottom thereof; a spacing device received in the receiving room of the cage and having bores; and a plurality of culture woods vertically received in the receiving room of the cage and passing through the bores of the spacing device respectively to form a passageway between each two of the neighboring culture woods, wherein each of the culture woods has a long axis and an end in the long axis touching the bottom of the cage.

In an embodiment, the spacing device has a least a positioning lath mounted in the receiving room of the cage, on which the bores are provided.

In an embodiment, wherein the spacing device has two positioning laths mounted in the receiving room of the cage with a predetermined distance therebetween, on each of which the bores are provided, and the bores of the two positioning laths are aligned with each other respectively for the culture woods pass through the aligning bores of the positioning laths.

In an embodiment, an included angle between a normal axis of the bottom of the cage and the long axis of the culture wood is in a range between 5 degrees and 0.

In an embodiment, the cage has a frame and laths mounted on the frame, and the apertures are form on the latch respectively.

In an embodiment, the culture woods are made of red wood.

In an embodiment, the cage is provided with a ring.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
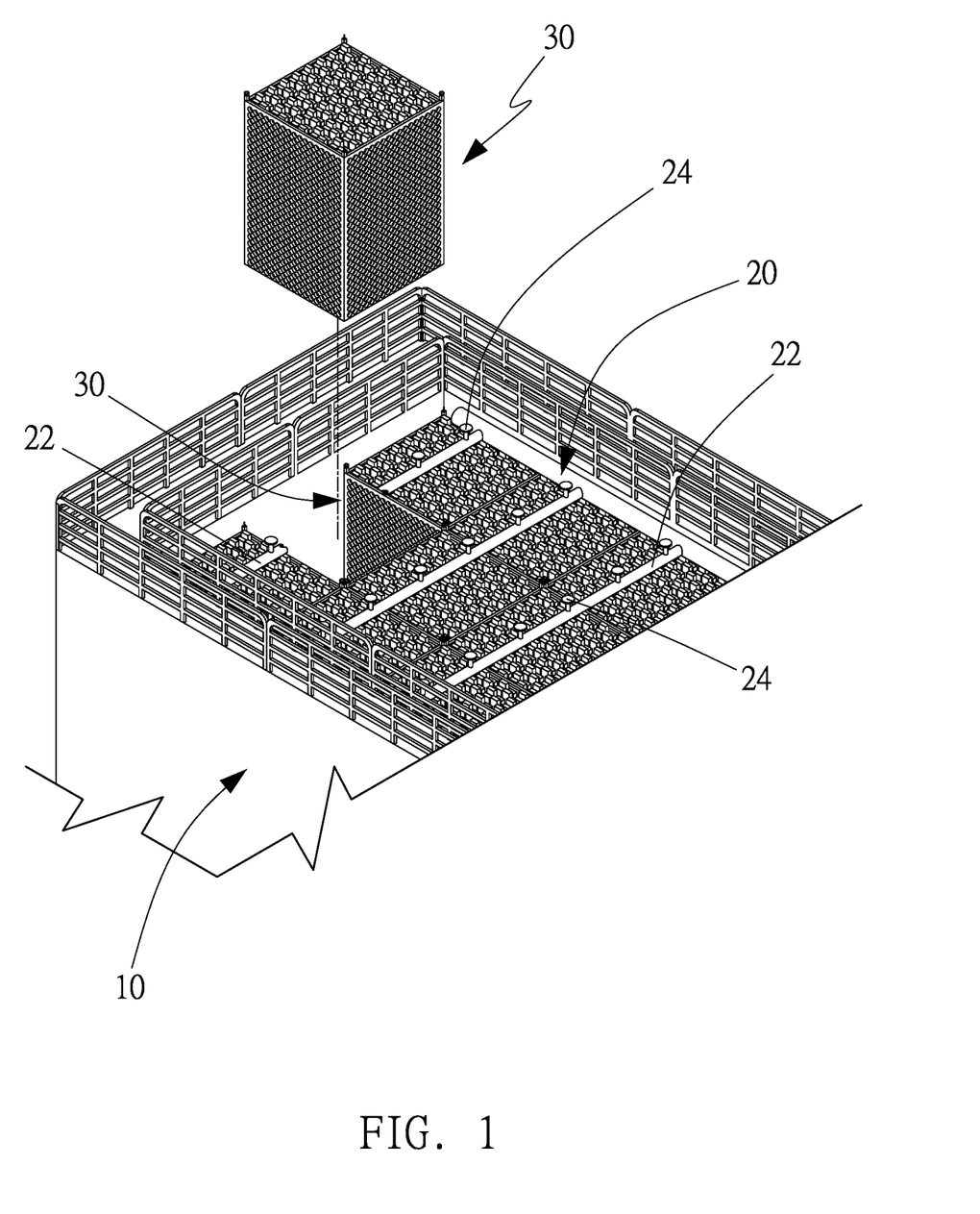
FIG. 1 is a partial perspective view of the trickling filter of a preferred embodiment of the present invention.

FIG. 1 shows a trickling filter 10, above which a spraying device 20 is provided and in which a plurality of microbiological culture apparatuses 30 are provided. The spraying device 20 includes a plurality of pipes 22 and spray nozzles 24 connected to ends of the pipes 22 respectively. The microbiological culture apparatuses 30 are under the spraying device 20.

Figure 2:
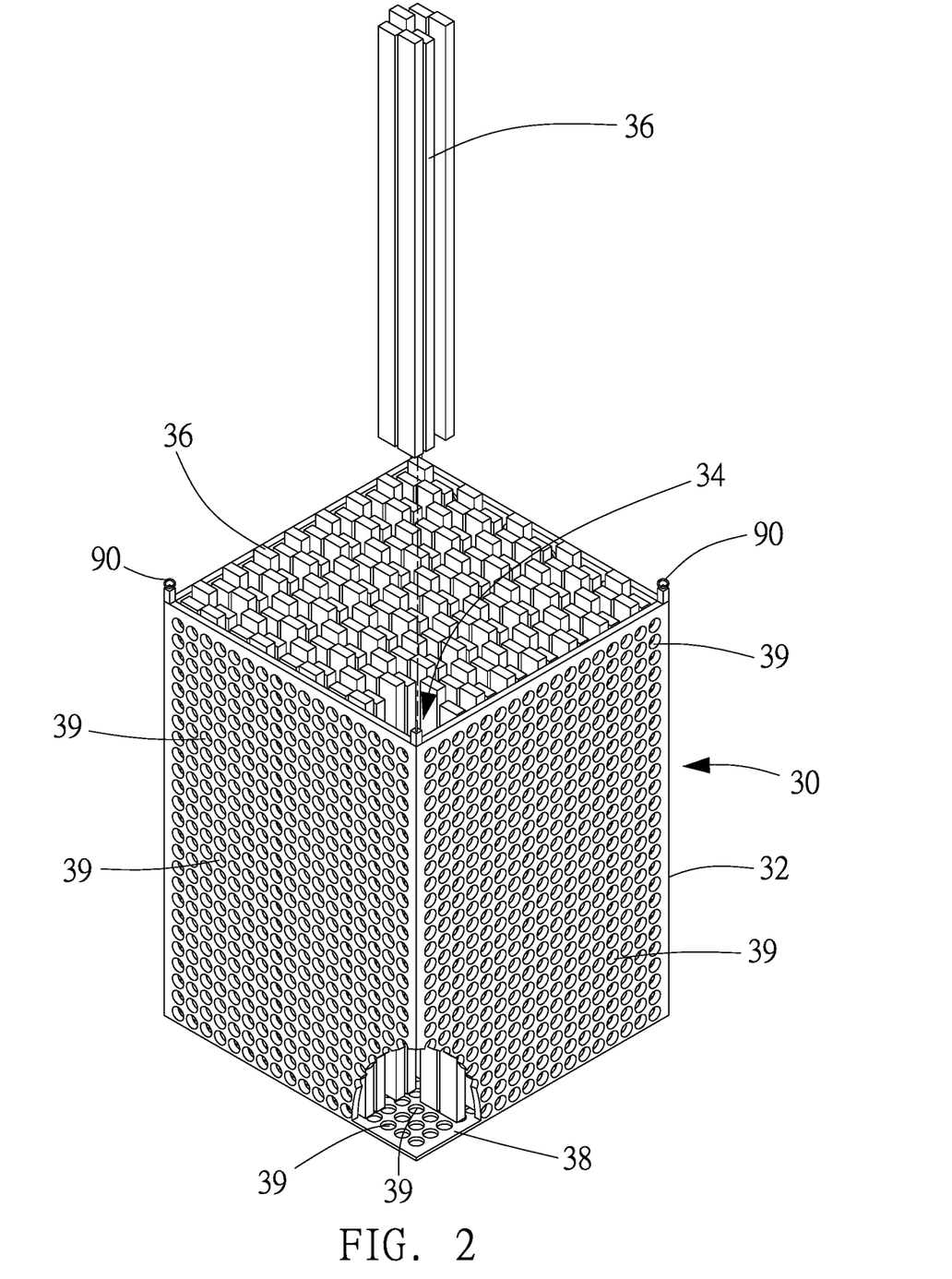
FIG. 2 is a perspective view of the microbiological culture apparatus of the preferred embodiment of the present invention.

Each of the microbiological culture apparatuses 30 includes a cage 32 and a plurality of culture woods 36 received in the cage 32. The cage 32 has a receiving room 34 therein and an opening on a top to be an entrance of the receiving room 34. The culture woods 36 are elongated wooden strips, each of which has a long axis. The culture woods 36 are vertically inserted into the receiving room 34 of the cage 32 via the opening, and arranged in a matrix form. As a result, each of the culture woods 36 has an end in the long axis touches a bottom 38 of the receiving room 34, and the culture woods 36 are arranged side by side without stacking. The cage 32 is made of metal and has apertures 39.

Figure 3:
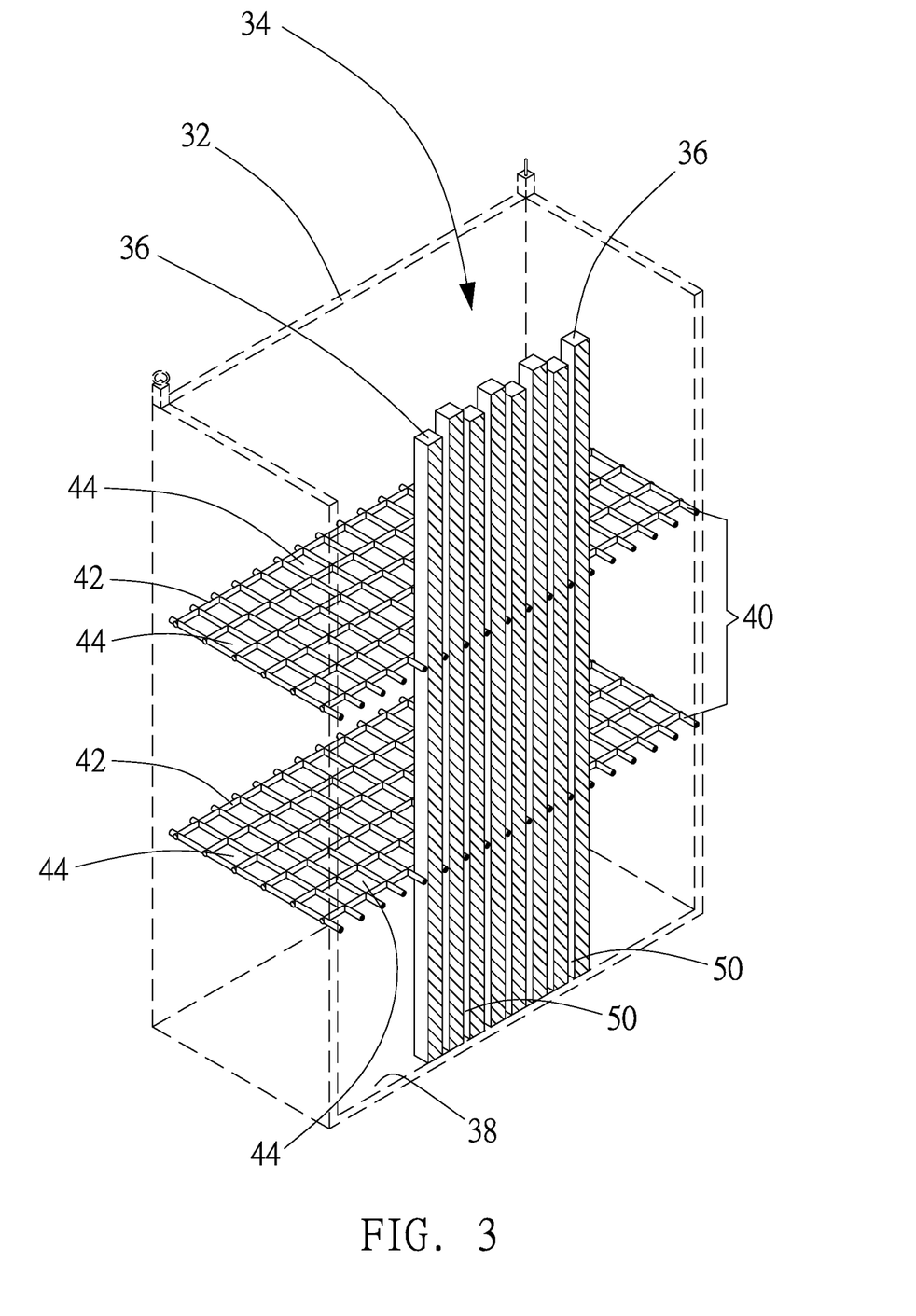
FIG. 3 is a sketch diagram of the microbiological culture apparatus of the preferred embodiment of the present invention.

As shown in FIG. 3, a spacing device 40 is received in the receiving room 34 of the cage 32. The spacing device 40 has a plurality of bores 44 arranged in a matrix form. The bores 44 of the spacing device 40 are slightly larger than the culture woods 36 for passing the culture woods 36 therethrough. As a result, the culture woods 36 are positioned by the spacing device 40 with a predetermined space between each of the neighboring culture woods 36.

In the present embodiment, the spacing device 40 includes two positioning laths 42 received in the receiving room 34 of the cage 32 with edges connected to an interior side of the cage 32. The positioning laths 42 are separated from each other and both of them are parallel to the bottom of the cage 32. Each of the positioning laths 42 has the bores 44 arranged in a matrix form, and the bores 44 of the two positioning laths 42 are aligned with each other in a vertical direction. As a result, the culture woods 36 may pass through the bore 44 of the upper positioning lath 42 and the right under bore 44 of the lower positioning lath 42 to keep the culture woods 36 in an upright status.

All the culture woods 36 pass through the bores 44 of the positioning laths 42 as described above, so that a passageway 50 is formed between each of the two neighboring culture woods 36.

Figure 4:
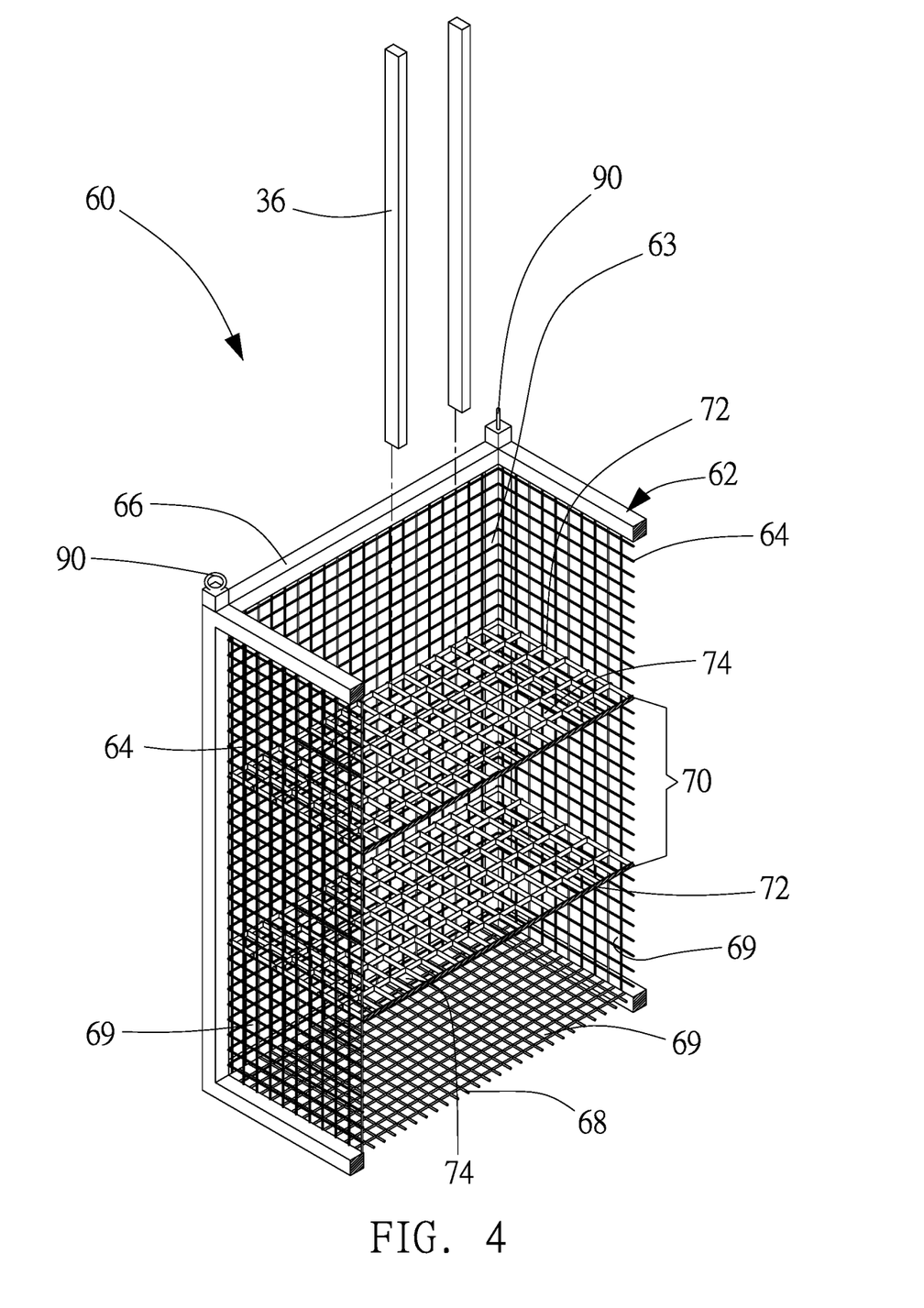
FIG. 4 is a perspective view of another microbiological culture apparatus of the preferred embodiment of the present invention.
Figure 5:
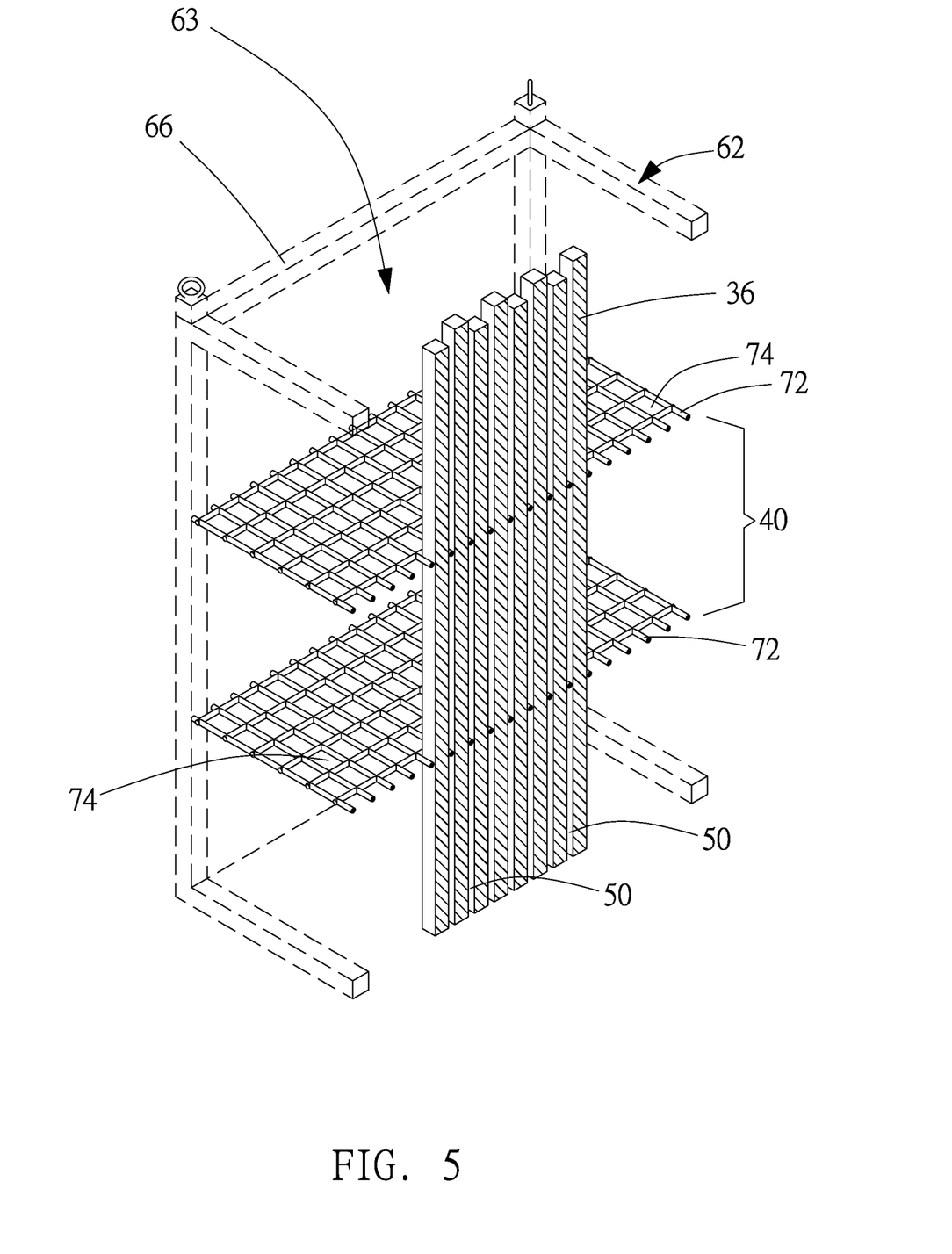
FIG. 5 is a sketch diagram of another microbiological culture apparatus of the preferred embodiment of the present invention.

FIGS. 4 and 5 show another microbiological culture apparatus 60, including a cage 62 and a plurality of the culture woods 36 vertically received in a receiving room 63 of the cage 62. The cage 62 has a frame 66 four side laths 64 and a bottom lath 68 mounted on the frame 66. All the side laths 64 and the bottom lath 68 have apertures 69.

A spacing device 70 is received in the receiving room 63 of the cage 62. The spacing device 70 has bores 74 for the culture woods 36 passing therethrough which makes the culture woods 36 have ends touching the bottom lath 68 of the cage 62.

In the present embodiment, the spacing device 70 has two positioning laths 72, which has the bores 72. The structure and function of the positioning laths 72 are the same as above, so I do not describe again.

Figure 6:
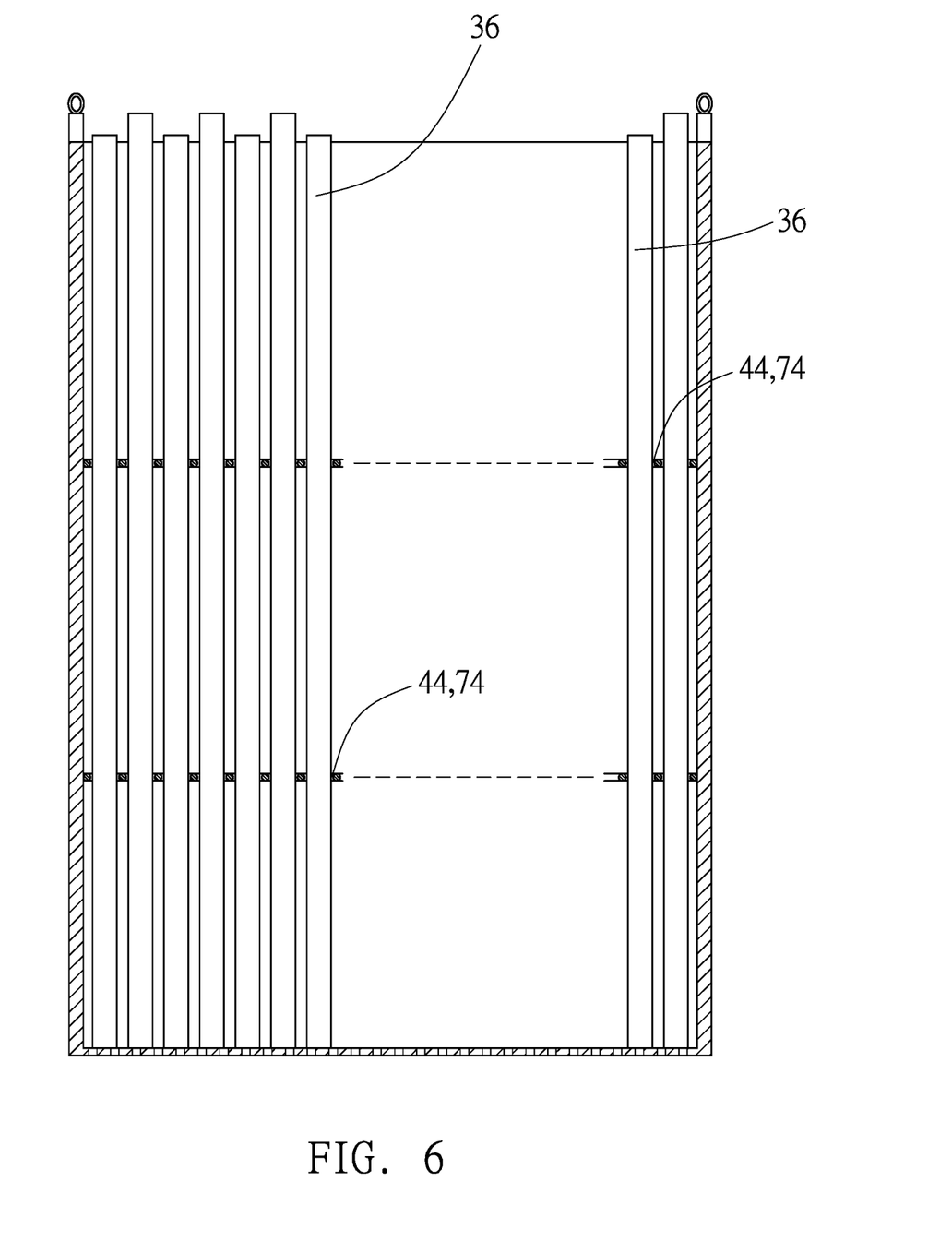
FIG. 6 is a sectional view of the microbiological culture apparatus of the preferred embodiment of the present invention.
Figure 7:
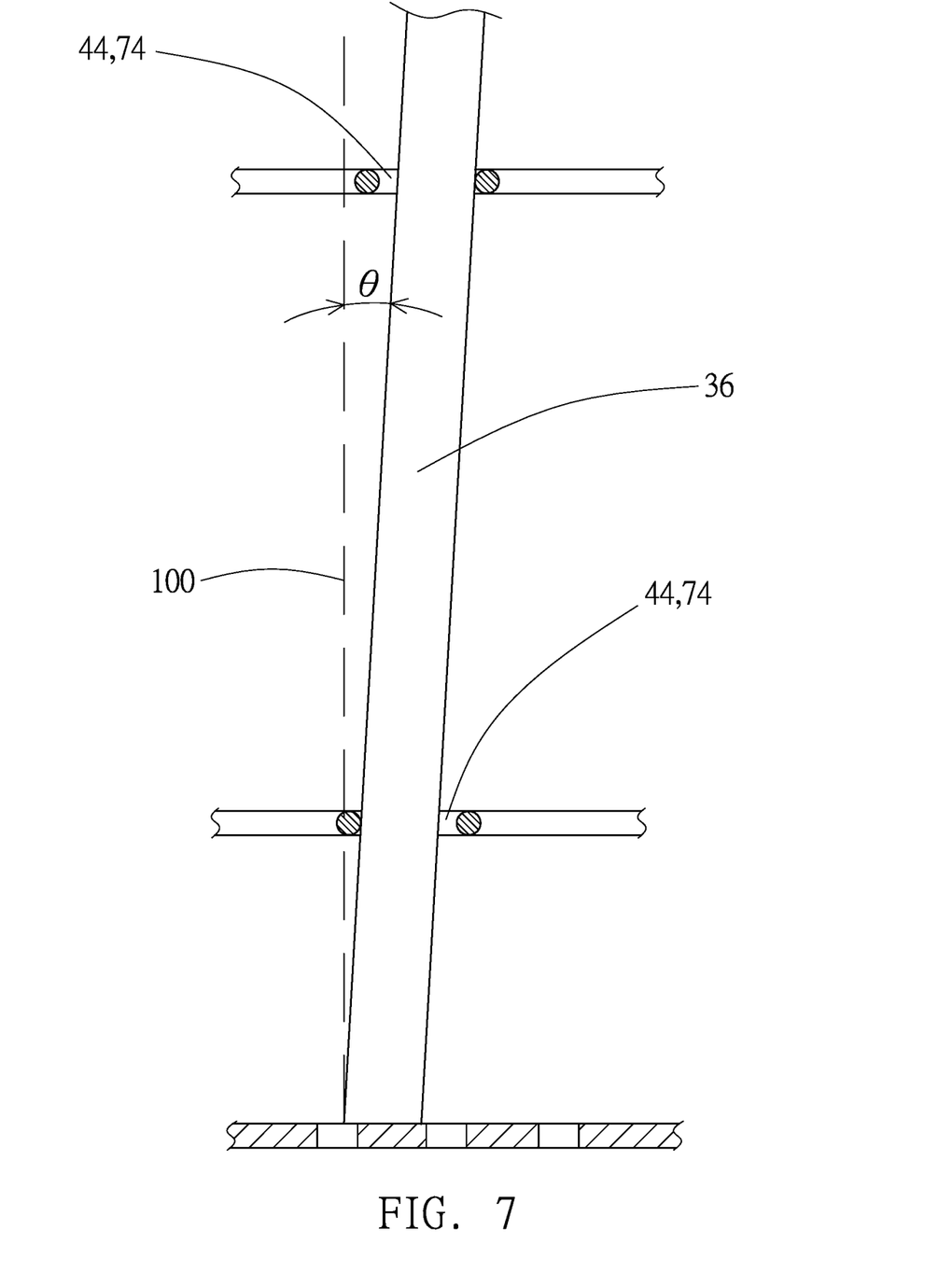
FIG. 7 is a sketch diagram of the microbiological culture apparatus of the preferred embodiment of the present invention, showing the culture wood in the cage.

As shown in FIGS. 6 and 7, the bores 44, 74 are slightly larger than the culture woods 36, so that the culture woods 36 may slightly incline to a side. An included angle θ between a normal axis of the bottom of the cage 32 and a long axis of the culture wood 36 is in a range between 5 degrees and 0. A preferred range of the included angle θ between 2 degrees and 0.

Figure 8:
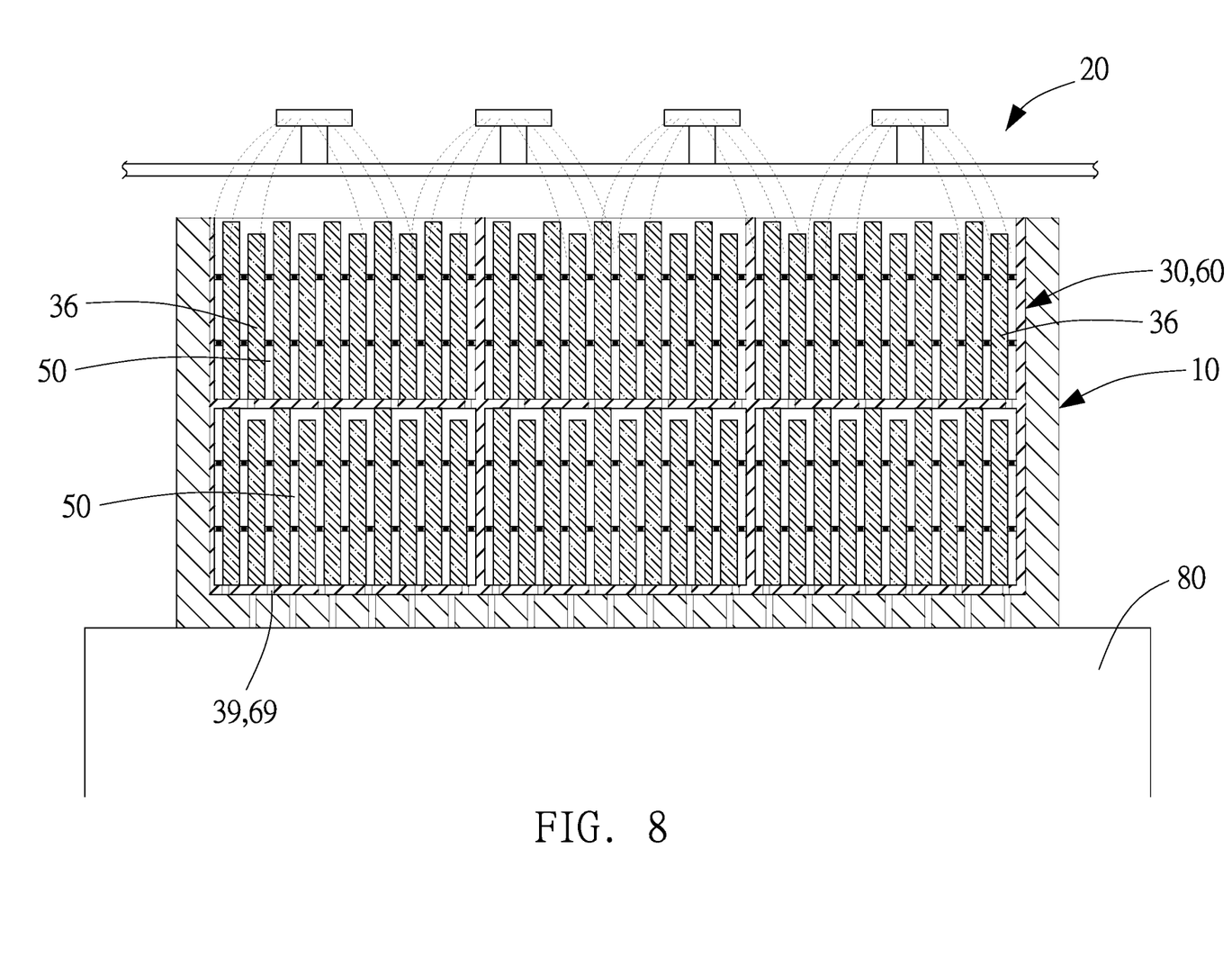
FIG. 8 is a sectional view of the preferred embodiment of the present invention.

As shown in FIG. 8, the microbiological culture apparatuses 30, 60 are stacked in the trickling filter 10. The spraying device 20 provides the wastewater to the microbiological culture apparatuses 30, 60. The wastewater flows through the passageways between the culture woods 36 and then flow out of the cages 32, 62 via the apertures of the cages 32, 62. At least the wastewater flows to an aerated tank 80.

In practice, the trickling filter 10 usually has a height about 4 meters to 6 meters, and heights of the cages 32, 62 are about 2 meters. Therefore, usually there are two or three layers of the cages 32, 62 stacked in the trickling filter 10. The positioning laths 42, 72 in the cages 32, 62 may restrict the culture woods 36 in the upright statuses and space them from each other to form the passageways 50.

Besides, the passageways 50 allow the wastewater flowing through the microbiological culture apparatuses 30, 60 easier that makes the microbiological culture apparatuses 30, 60 keep in a low temperature and have high dissolved oxygen. This environment is good for bacteria to grow to help the treatment.

As shown in FIGS. 2 and 4, the culture woods 36 are made of red wood. The cage 32, 62 is provided with four rings 90 to be hold by a suitable machine to hang the cage 32, 62 up or lower it. It is helpful to place the cages 32, 62 in the trickling filter 10 or take them out because it may need to clean or replace the culture woods 36 or fix or replace the cages 32, 62. The cages 32, 62 and the positioning laths 42, 72 are made of stainless steel.

It must be pointed out that the embodiments described above are only some preferred embodiments of the present invention. All equivalent structures which employ the concepts disclosed in this specification and the appended claims should fall within the scope of the present invention.

What is claimed is:

1. A microbiological culture apparatus of a wastewater treatment system, wherein the microbiological culture apparatus is received in a trickling filter and under a spraying device, comprising:
   a cage having a receiving room therein and a plurality of apertures on a bottom thereof;
   a spacing device received in the receiving room of the cage and having bores; and
   a plurality of culture woods vertically received in the receiving room of the cage and passing through the bores of the spacing device respectively to form a passageway between each two of the neighboring culture woods, wherein the culture woods are arranged in a vertical direction to prevent the culture woods from stacking, and each of the culture woods has a long axis and has an end in the long axis touching the bottom of the cage;
   wherein the spraying device sprays wastewater on surfaces the culture woods in the cage, and the wastewater flows out of the cage via the apertures on the bottom of the receiving room along the long axes of the culture woods.

2. The microbiological culture apparatus of claim 1, wherein the culture woods are made of red wood.

3. The microbiological culture apparatus of claim 1, wherein the cage is provided with a ring.

* * * * *